United States Patent Office 2,777,788
Patented Jan. 15, 1957

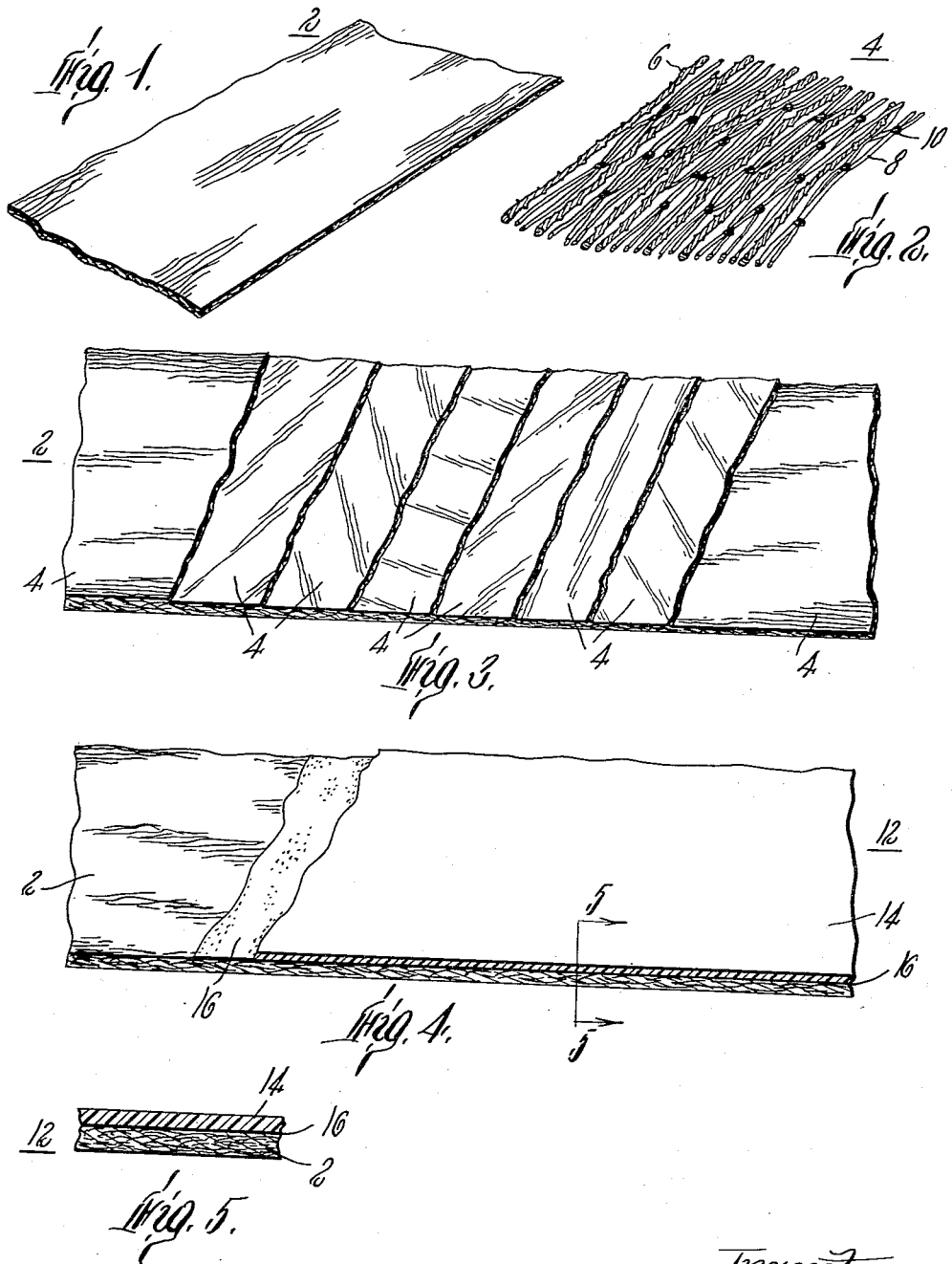

2,777,788

COMPOSITE SHEET MATERIAL

Lawrence D. Bragg, Jr., Andover, Mass., assignor, by mesne assignments, to The General Tire & Rubber Company, Akron, Ohio, a corporation of Ohio Application November 15, 1952, Serial No. 320,668

2 Claims. (Cl. 154—48)

This invention relates to composite sheet material, and more particularly to such material having a facing composed of calendered flexible vinyl sheeting.

Objects of this invention are to provide composite sheet material embodying calendered flexible vinyl sheeting, and exhibiting improved physical properties as well as pleasing appearance.

In accordance with the above and other objects, the composite sheet material provided by this invention, while useful for a variety of purposes, exhibits highly advantageous characteristics for furniture covering material. Thus, backed calendered vinyl sheeting of this invention exhibits substantial resistance to the tearing of stitches made therethrough. Furthermore, the character of the sheet material is such as to provide a cushioning action to the stitches, and thereby increase the strength thereof. In addition, the composite sheet material is soft, pliable and readily manipulable, and exhibits as upholstery a rich, plump, cushioned appearance. While the composite material includes a backing, no objectionable alteration of the appearance of the outer surface of the vinyl sheeting, known as "strike-through," is produced by the backing. In a preferred form of the invention the composite or laminated sheet material exhibits substantial strength and easy stretchability in any direction. The character of the sheet material thus is such as to exhibit high resistance to directional tear.

The composite sheet material of this invention comprises a facing composed of calendered flexible vinyl sheeting, and a backing composed of felt sheeting. The backing is adhesively secured to the facing at the meeting surfaces thereof. Preferably the adhesive is disposed only at said meeting surfaces, and the backing secured to the facing without embedment of either layer in the other. In the latter construction, when the composite material is stretched, each layer may exert substantially its normal resistance to such stretching.

The formulation of the calendered vinyl sheeting of the facing layer is not critical. For the vinyl constituent there may be employed a polymer of vinyl chloride, or a copolymer of vinyl chloride and vinyl acetate containing about 90% vinyl chloride and about 10% vinyl acetate. With the vinyl polymer there may be compounded pigments, plasticizers, stabilizers, flame retardants and lubricants, as known in the art. For upholstery, which is subjected to an abrasive effect known as "wicking action," it is highly desirable that a substantial portion of the plasticizer be of the polymeric or "permanent" type. An illustrative formulation is as follows:

58% vinyl chloride resin
15% polymeric plasticizer (Rohm & Haas Paraplex)
15% monomeric pasticizer (dioctyl phthalate)
4% antimony oxide
3% stabilizers and lubricants
5% pigments in dispersed form The compounded material may be calendered to form a continuous sheet of desired width and thickness. For upholstery purposes, the sheet may be calendered to a thickness in the neighborhood of 0.010 to 0.030 inch.

For certain purposes, the felt sheet of the backing layer may be of conventional character. However, in a preferred form of the invention, the felt sheeting or backing comprises a multilayer lamina containing a substantial percentage of nylon fibers. These nylon fibers preferably are relatively long, extend in all directions in the plane of the sheeting, and are bonded at intersections by adhesive material. This felt sheeting exhibits substantial strength and easy stretchability in all directions. The preferred felt sheeting shown and described herein is per se the subject of my copending application Serial No. 320,667, filed November 15, 1952.

The adhesive for securing the backing to the facing at the meeting surfaces thereof is selected from those which are compatible with and adhesively attachable to the vinyl sheeting. Advantageously the adhesive may be of thermoplastic character softening at reasonably low temperatures, such as a well plasticized copolymer of vinyl chloride and vinyl acetate. A satisfactory adhesive of this type is that available commercially under the trade name of "Vinylite VYHH," which is a copolymer containing 85–88 percent vinyl chloride and 12–15 percent vinyl acetate.

In the drawings illustrating the invention in diagrammatic fashion:

Figure 1 is a perspective view of the felt sheeting;
Fig. 2 is a perspective view of one layer of the felt sheeting;
Fig. 3 is a perspective view, partly broken away, showing the multilayer felt sheeting and the arrangement of the layers therein;
Fig. 4 is a perspective view partly broken away, of the composite sheet material; and
Fig. 5 is a vertical section of the composite sheet material, taken on line 5—5 of Fig. 4.

Referring to the drawings, the felt sheeting 2 is shown as composed of individual layers 4, each of which contains substantial proportions of wool fibers 6 and relatively long nylon fibers 8. Each layer 4 may contain in the neighborhood of 30 to 35 percent by weight, based on the fiber content, of nylon fibers 8. In each layer 4 the fibers are primarily oriented in one direction in the plane of the layer. It will be understood, of course, that the layer 4 may contain fibers of other materials such as cotton, rayon and the like.

The felt sheeting 2 is shown as comprising eight layers 4 superimposed one upon another with the fiber orientations of the layers in angular relationship in the neighborhood of, and not more than, about 60°. The fibers of the top and bottom layers 4 are indicated as being oriented in the same direction. The latter feature is of particular advantage when the felt 2 is in the form of continuous rolls or sheets, in which case the fiber orientation of the top and bottom layers 4 will be in the linear direction of the roll.

In the preparation of the web or sheet 2, the layers 4 are compacted. Conventionally, the felted sheet may be scoured, and while the material is still wet, it may be treated to bond the nylon fibers at intersections. This may be accomplished by saturating the still moist felted material with an aqueous dispersion of an adhesive material having an affinity for nylon, such as a polymer of butadiene-acrylonitrile, a synthetic rubberlike material. This adhesive bond is illustrated at 10 in Fig. 2.

The resulting felt sheet 2 preferably has a dry weight in the neighborhood of about 3 to 6 ounces per square yard, and exhibits substantially uniform stretch and strength in all directions.

The composite sheet 12 of this invention is diagrammatically illustrated in Figs. 4 and 5. The facing 14 comprises suitably compounded and calendered vinyl sheeting as hereinbefore described. The felt backing 2 is coextensively bonded to the vinyl facing 14 by adhesive 16 disposed essentially only at the junction or meeting surfaces of said layers. Furthermore, there is substantially no embedment of either layer 2 or 14 in the other.

The adhesive 16 is of such composition that it will adhesively bond the meeting surfaces of the felt layer 2 and the vinyl layer 14. Conveniently, this is a well-plasticized polymer of vinyl chloride.

The adhesive bonding of layers 2 and 14 may be carried out in any one of several ways. The adhesive layer 16, preferably is just applied to the surface of felt layer 2, without substantial penetration of the adhesive into, and stiffening of, the felt. This may be accomplished by spraying plasticized vinyl chloride-vinyl acetate copolymer in substantially cob-web form on the attaching surface of the felt, from a volatile solvent dispersion, or in molten form. Alternatively, an aqueous mechanical dispersion of comminuted copolymer of vinyl chloride and vinyl acetate may be spread over the felt sheeting 2 while the felt is moist, as after the scouring operation, whereby the particles of comminuted polymer are deposited on the surface of the felt. In the latter case, the water in the felt is removed before the operation of bonding the felt to the vinyl sheet.

While the assembly of the composite sheet material 12 may be carried out by the solvent activation of the vinyl adhesive, it is preferred to utilize the thermoplastic characteristics of the vinyl adhesive and the vinyl sheeting. Thus, in the event that both the vinyl facing 14 and the adhesive-coated felt backing are at room temperature when they are to be assembled, both laminae may be heated to a temperature at which the adhesive 16 is active and the vinyl sheet 14 sufficiently soft so that the adhesive 16 and the substance of the sheet 14 may unite integrally. The adhesive union of the facing 14 and felting 2 may then be brought about by pressing them together under attaching pressure which is sufficient to bring about adequate adhesion but insufficient to bring about substantial embedment of either layer 2 or 14 in the other.

A preferred method of adhesively securing the vinyl facing 14 and felt backing 2 to form the composite sheet material 12 is set forth in my copending application Serial No. 320,669, filed November 15, 1952. According to this method, the vinyl sheet is combined with the felt backing immediately after the calendering of the vinyl facing, before it has cooled materially. The vinyl adhesive-coated felt sheeting is heated to a temperature at which the adhesive is active, and the felt and vinyl sheeting brought together under pressure immediately after the latter emerges from the calender rolls, after which the combined material is permitted to cool. The combining pressure, however, is moderate as distinguished from the high calendering pressure, so that embedment of either facing or backing layer in the other is avoided.

When the resulting composite structure 12 is stretched, in its subsequent utilization as upholstery covering or otherwise, each layer may exert substantially its normal resistance to such stretching, with highly advantageous results as indicated hereinbefore, including full utilization of the properties of the felt backing.

In the composite sheet material 12, the outer surface of the vinyl layer 14 may be printed, for example to simulate the coloring of leather. Such printing may take place before or after the adhesive attachment of the vinyl sheeting 14 to the felt sheeting 2. However, when the combining takes place immediately after the calendering of the vinyl sheet, as in the preferred method described above, any such printing will take place after the combining operation.

The composite sheet material 12 lends itself admirably to subsequent embossing of the outer surface of the vinyl layer 14, both from the standpoint of the embossing operation itself, and with respect to the character and appearance of the embossed product.

It will be understood that various modifications may be made in the disclosures herein while still coming within the scope of the appended claims.

What I claim is:

1. Flexible sheet material comprising a lamina of polyvinyl plastic and a coextensive multilayer lamina of felt sheeting; said felt sheeting exhibiting a dry weight in the neighborhood of 3 to 6 ounces per square yard and being composed primarily of nylon and wool fibers, said nylon fibers constituting about 30 to about 35 percent by weight of the fiber content of the sheeting, said sheeting comprising at least eight layers each containing nylon and wool fibers primarily oriented in one direction in the plane of the layer, said layers being superimposed one upon another with the fiber orientations of adjacent layers in angular relationship of not more than about 60°, the fibers of the top and bottom layers being oriented in the same direction, said nylon fibers being bonded together at their intersections by butadiene-acrylonitrile copolymer, said layers being compacted to form a web exhibiting substantially uniform stretch and strength in all directions; said laminae being coextensively secured together, without embedment of either lamina in the other, by a vinyl adhesive selected from the group consisting of vinyl chloride and vinyl chloride-vinyl acetate polymer disposed essentially only at the meeting surfaces of said laminae.

2. Flexible sheet material comprising a lamina of polyvinyl plastic and a coextensive lamina of felt sheeting; said felt sheeting exhibiting a dry weight in the neighborhood of 3 to 6 ounces per square yard and being composed primarily of nylon and wool fibers, said nylon fibers constituting about 30 to about 35 percent by weight of the fiber content of the sheeting, said sheeting comprising at least one layer containing nylon and wool fibers primarily oriented in one direction in the plane of the layer, said nylon fibers being bonded together at their intersections by butadiene-acrylonitrile copolymer; said laminae being compacted to form a web exhibiting substantially uniform stretch and strength in all directions and being coextensively secured together, without embedment of either lamina in the other, by a vinyl adhesive selected from the group consisting of vinyl chloride and vinyl chloride-vinyl acetate polymer disposed essentially only at the meeting surfaces of said laminae.

References Cited in the file of this patent

UNITED STATES PATENTS

| | | |
|---|---|---|
| 2,270,223 | Schlack | Jan. 13, 1942 |
| 2,444,094 | Duggan | June 29, 1948 |
| 2,453,052 | Etten | Nov. 2, 1948 |
| 2,530,441 | Reinhardt et al. | Nov. 21, 1950 |
| 2,533,976 | Teague | Dec. 12, 1950 |
| 2,543,101 | Francis | Feb. 27, 1951 |
| 2,589,502 | Lurie | Mar. 18, 1952 |